(12) United States Patent
Cheng

(10) Patent No.: US 10,525,787 B2
(45) Date of Patent: *Jan. 7, 2020

(54) ELECTRIC VEHICLE THERMAL MANAGEMENT SYSTEM WITH SERIES AND PARALLEL STRUCTURE

(71) Applicant: Thunder Power New Energy Vehicle Development Company Limited, Central (HK)

(72) Inventor: Ming-Chieh Cheng, Taoyuan (TW)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 163 days.

This patent is subject to a terminal disclaimer.

(21) Appl. No.: 15/725,041

(22) Filed: Oct. 4, 2017

(65) Prior Publication Data

US 2018/0029440 A1 Feb. 1, 2018

Related U.S. Application Data

(63) Continuation of application No. 15/365,660, filed on Nov. 30, 2016, now Pat. No. 9,809,082, which is a
(Continued)

(51) Int. Cl.
*B60H 1/04* (2006.01)
*B60K 11/04* (2006.01)
(Continued)

(52) U.S. Cl.
CPC ..... *B60H 1/00392* (2013.01); *B60H 1/00278* (2013.01); *B60H 1/00321* (2013.01);
(Continued)

(58) Field of Classification Search
CPC ............ B60H 1/00385; B60H 1/00392; B60H 1/00278; B60H 1/00321; B60H 1/00428;
(Continued)

(56) References Cited

U.S. PATENT DOCUMENTS 4,026,468 A 5/1977 Tinder et al.
4,079,275 A 3/1978 Fu et al.
(Continued)

FOREIGN PATENT DOCUMENTS

CN 101291834 A 10/2008
CN 102191991 A 9/2011
(Continued)

OTHER PUBLICATIONS

U.S. Appl. No. 14/748,210 , "Notice of Allowance", dated Jun. 3, 2016, 12 pages.
(Continued)

*Primary Examiner* — John D Walters
(74) *Attorney, Agent, or Firm* — Kilpatrick Townsend & Stockton

(57) ABSTRACT

Electric vehicle thermal management systems and electric vehicles using the thermal management system, are disclosed. A passenger cabin is heated by the heat dissipated from a battery and/or a motor. A cooling circuit in the management system fluidly connects the battery, the motor and a first radiator in series. The first radiator provides a heat source to the passenger cabin by means of the heat dissipated from the battery and/or the electric motor. Under certain conditions, the electric motor is selectively separated from the cooling circuit, so that when the passenger cabin needs to be heated, the thermal management system can provide heat to the passenger cabin without affecting the heat dissipation of the battery.

14 Claims, 4 Drawing Sheets

Related U.S. Application Data continuation of application No. 14/816,064, filed on Aug. 3, 2015, now Pat. No. 9,533,551.

(60) Provisional application No. 62/150,848, filed on Apr. 22, 2015, provisional application No. 62/133,991, filed on Mar. 16, 2015.

(51) Int. Cl.

| | | |
|---|---|---|
| *B60H 1/00* | (2006.01) | |
| *B60H 1/14* | (2006.01) | |
| *H01M 10/625* | (2014.01) | |
| *H01M 10/615* | (2014.01) | |
| *H01M 10/663* | (2014.01) | |
| *H01M 10/6568* | (2014.01) | |
| *H01M 10/6569* | (2014.01) | |
| *H01M 10/6571* | (2014.01) | |
| *H01M 10/667* | (2014.01) | |
| *H01M 10/613* | (2014.01) | |
| *B60L 50/50* | (2019.01) | |
| *B60L 58/24* | (2019.01) | |
| *B60L 58/26* | (2019.01) | |
| *B60H 1/03* | (2006.01) | |
| *B60H 1/32* | (2006.01) | |
| *B60H 1/22* | (2006.01) | |
| *B60L 1/02* | (2006.01) | |

(52) U.S. Cl.
CPC ..... *B60H 1/00428* (2013.01); *B60H 1/00885* (2013.01); *B60H 1/03* (2013.01); *B60H 1/04* (2013.01); *B60H 1/143* (2013.01); *B60H 1/2218* (2013.01); *B60H 1/2221* (2013.01); *B60H 1/32* (2013.01); *B60K 11/04* (2013.01); *B60L 1/02* (2013.01); *B60L 50/50* (2019.02); *B60L 58/24* (2019.02); *B60L 58/26* (2019.02); *H01M 10/613* (2015.04); *H01M 10/615* (2015.04); *H01M 10/625* (2015.04); *H01M 10/6568* (2015.04); *H01M 10/6569* (2015.04); *H01M 10/6571* (2015.04); *H01M 10/663* (2015.04); *H01M 10/667* (2015.04); *B60H 2001/00307* (2013.01); *H01M 2220/20* (2013.01)

(58) Field of Classification Search
CPC .. B60H 1/00878; B60H 1/02; B60H 1/00885; B60H 1/03; B60H 1/04; B60H 1/143; B60H 1/2218; B60H 1/2221; B60H 1/32; B60H 2001/00307; B60K 11/02; B60K 11/04; B60L 11/187; B60L 11/1874; B60L 1/02; B60L 50/50; B60L 58/24; B60L 58/26; H01M 10/625; H01M 10/63; H01M 10/6568; H01M 10/663; H01M 10/486; H01M 10/613; H01M 10/615; H01M 10/6571; H01M 10/667; H01M 10/6569; H01M 2220/20
USPC ..................................... 180/68.1, 68.2, 68.4
See application file for complete search history.

(56) References Cited

U.S. PATENT DOCUMENTS

| | | | |
|---|---|---|---|
| 4,248,383 A | 2/1981 | Savage et al. | |
| 4,281,276 A | 7/1981 | Cutler et al. | |
| 4,324,363 A | 4/1982 | Rauen, Jr. | |
| 4,926,105 A | 5/1990 | Mischenko et al. | |
| 5,121,044 A | 6/1992 | Goldman | |
| 5,289,890 A | 3/1994 | Toyoda et al. | |
| 5,345,155 A | 9/1994 | Masaki et al. | |
| 5,585,204 A | 12/1996 | Oshida et al. | |
| 5,619,784 A | 4/1997 | Kihara et al. | |
| 5,875,691 A | 3/1999 | Hata et al. | |
| 5,889,342 A | 3/1999 | Hasebe et al. | |
| 6,126,219 A | 10/2000 | Wilkinson et al. | |
| 6,347,528 B1* | 2/2002 | Iritani | B60H 1/00357 62/324.6 |
| 6,357,541 B1* | 3/2002 | Matsuda | B60K 6/22 180/68.2 |
| 6,367,570 B1 | 4/2002 | Long, III et al. | |
| 6,450,275 B1 | 9/2002 | Gabriel et al. | |
| 6,481,230 B2 | 11/2002 | Kimishima et al. | |
| 6,772,504 B2 | 8/2004 | Weidman et al. | |
| 7,332,242 B2 | 2/2008 | Sato et al. | |
| 7,436,139 B2 | 10/2008 | Maslov et al. | |
| 7,451,808 B2 | 11/2008 | Busse et al. | |
| 7,789,176 B2* | 9/2010 | Zhou | B60H 1/00278 180/65.1 |
| 7,834,500 B2 | 11/2010 | Savant | |
| 7,841,431 B2* | 11/2010 | Zhou | B60H 1/00278 180/65.1 |
| 8,020,656 B2 | 9/2011 | Inoue et al. | |
| 8,191,618 B2* | 6/2012 | Gering | B60H 1/00278 165/202 |
| 8,336,319 B2* | 12/2012 | Johnston | B60L 3/0046 62/79 |
| 8,479,855 B2 | 7/2013 | Kim et al. | |
| 8,527,130 B2 | 9/2013 | Kitahata et al. | |
| 8,564,246 B2 | 10/2013 | Wade et al. | |
| 8,571,738 B1 | 10/2013 | Potter et al. | |
| 8,818,716 B1 | 8/2014 | El Dokor et al. | |
| 8,892,281 B2 | 11/2014 | Suzuki et al. | |
| 8,955,345 B2 | 2/2015 | Meitinger et al. | |
| 9,180,753 B2* | 11/2015 | Kim | B60H 1/00885 |
| 9,250,020 B2 | 2/2016 | Vikstrom et al. | |
| 9,533,551 B2 | 1/2017 | Cheng | |
| 9,539,877 B2 | 1/2017 | Cheng | |
| 9,802,460 B2 | 10/2017 | Cheng | |
| 9,809,082 B2 | 11/2017 | Cheng | |
| 2002/0005440 A1 | 1/2002 | Holt et al. | |
| 2002/0134857 A1 | 9/2002 | Zimmer | |
| 2002/0182493 A1 | 12/2002 | Ovshinsky et al. | |
| 2003/0155001 A1 | 8/2003 | Hoetzer et al. | |
| 2004/0113589 A1 | 6/2004 | Crisp et al. | |
| 2004/0195833 A1 | 10/2004 | Zoellner | |
| 2005/0206511 A1 | 9/2005 | Heenan et al. | |
| 2006/0021811 A1 | 2/2006 | Kuang et al. | |
| 2006/0132101 A1 | 6/2006 | Ambrosio et al. | |
| 2006/0175995 A1 | 8/2006 | Shinmura et al. | |
| 2007/0009787 A1 | 1/2007 | Straubel et al. | |
| 2007/0077541 A1 | 4/2007 | Champagne et al. | |
| 2007/0084484 A1 | 4/2007 | Porter et al. | |
| 2007/0278325 A1 | 12/2007 | Sato et al. | |
| 2008/0024020 A1 | 1/2008 | Iund et al. | |
| 2008/0067965 A1 | 3/2008 | Bailey et al. | |
| 2008/0116379 A1 | 5/2008 | Teder | |
| 2008/0210780 A1 | 9/2008 | Discher et al. | |
| 2009/0023056 A1 | 1/2009 | Adams et al. | |
| 2009/0146610 A1 | 6/2009 | Trigiani | |
| 2009/0153087 A1 | 6/2009 | Lim et al. | |
| 2009/0206689 A1 | 8/2009 | Harada et al. | |
| 2009/0250533 A1 | 10/2009 | Akiyama et al. | |
| 2010/0152936 A1 | 6/2010 | Wang et al. | |
| 2010/0230991 A1 | 9/2010 | Fioravanti | |
| 2011/0031921 A1 | 2/2011 | Han | |
| 2011/0073142 A1 | 3/2011 | Hattori et al. | |
| 2011/0128543 A1 | 6/2011 | Choi | |
| 2011/0159340 A1 | 6/2011 | Hu et al. | |
| 2011/0229749 A1 | 9/2011 | Kim et al. | |
| 2011/0246005 A1 | 10/2011 | King et al. | |
| 2011/0266375 A1 | 11/2011 | Ono et al. | |
| 2011/0292212 A1 | 12/2011 | Tanabe et al. | |
| 2011/0309796 A1 | 12/2011 | Firehammer | |
| 2012/0163657 A1 | 6/2012 | Shellshear | |
| 2012/0225341 A1 | 9/2012 | Major et al. | |
| 2012/0266922 A1 | 10/2012 | Krahn et al. | |
| 2012/0291987 A1 | 11/2012 | Himmer et al. | |
| 2012/0297809 A1* | 11/2012 | Carpenter | B60L 1/003 62/244 |

(56) References Cited

U.S. PATENT DOCUMENTS

| | | |
|---|---|---|
| 2012/0303397 A1 | 11/2012 | Prosser |
| 2012/0313562 A1 | 12/2012 | Murao et al. |
| 2013/0038151 A1 | 2/2013 | Ohashi et al. |
| 2013/0057117 A1 | 3/2013 | Suzuki et al. |
| 2013/0092758 A1 | 4/2013 | Tanaka et al. |
| 2013/0124038 A1 | 5/2013 | Naboulsi |
| 2013/0144470 A1 | 6/2013 | Ricci |
| 2013/0153338 A1 | 6/2013 | Yamauchi |
| 2013/0221926 A1 | 8/2013 | Furtner |
| 2013/0235381 A1 | 9/2013 | Kroekel et al. |
| 2014/0021924 A1 | 1/2014 | Abe et al. |
| 2014/0033865 A1 | 2/2014 | Suzuki et al. |
| 2014/0077631 A1 | 3/2014 | Watanabe et al. |
| 2014/0081521 A1 | 3/2014 | Fröjdh et al. |
| 2014/0090673 A1 | 4/2014 | Atsumi et al. |
| 2014/0121927 A1 | 5/2014 | Hanita |
| 2014/0124159 A1* | 5/2014 | Kim ............... B60H 1/32 165/42 |
| 2014/0141300 A1 | 5/2014 | Ronning et al. |
| 2014/0145933 A1 | 5/2014 | Chae et al. |
| 2014/0167655 A1 | 6/2014 | Chatroux et al. |
| 2014/0203782 A1 | 7/2014 | Xue et al. |
| 2014/0216709 A1* | 8/2014 | Smith ............ B60H 1/00642 165/287 |
| 2014/0247135 A1 | 9/2014 | Proud |
| 2014/0277936 A1 | 9/2014 | El Dokor et al. |
| 2014/0306826 A1 | 10/2014 | Ricci |
| 2014/0309849 A1 | 10/2014 | Ricci |
| 2014/0311704 A1* | 10/2014 | Yokoyama ........... H02K 9/19 165/41 |
| 2014/0354291 A1 | 12/2014 | Kikuchi et al. |
| 2015/0022664 A1 | 1/2015 | Pflug et al. |
| 2015/0054933 A1 | 2/2015 | Wasiek et al. |
| 2015/0069974 A1 | 3/2015 | Okada et al. |
| 2015/0138357 A1 | 5/2015 | Romack et al. |
| 2015/0141043 A1 | 5/2015 | Abramson et al. |
| 2015/0151722 A1 | 6/2015 | Gokan et al. |
| 2015/0168174 A1 | 6/2015 | Abramson et al. |
| 2015/0171642 A1 | 6/2015 | Kato et al. |
| 2015/0188334 A1 | 7/2015 | Dao et al. |
| 2015/0203077 A1 | 7/2015 | Gokan |
| 2015/0317527 A1 | 11/2015 | Graumann et al. |
| 2015/0367859 A1 | 12/2015 | Roth et al. |
| 2016/0001330 A1 | 1/2016 | Romack et al. |
| 2016/0048725 A1 | 2/2016 | Holz et al. |
| 2016/0056510 A1 | 2/2016 | Takeuchi et al. |
| 2016/0086391 A1 | 3/2016 | Ricci |
| 2016/0271905 A1 | 9/2016 | Lo |
| 2016/0271926 A1 | 9/2016 | Lo |
| 2016/0272036 A1 | 9/2016 | Chen et al. |
| 2016/0272039 A1 | 9/2016 | Cheng |
| 2016/0272040 A1 | 9/2016 | Cheng |
| 2016/0272043 A1 | 9/2016 | Cheng |
| 2016/0272044 A1 | 9/2016 | Cheng |
| 2016/0272045 A1 | 9/2016 | Chen et al. |
| 2016/0272082 A1 | 9/2016 | Chuang |
| 2016/0272083 A1 | 9/2016 | Dai |
| 2016/0272084 A1 | 9/2016 | Chuang |
| 2016/0272085 A1 | 9/2016 | Dai |
| 2016/0272087 A1 | 9/2016 | Lai |
| 2016/0272164 A1 | 9/2016 | Hsiao et al. |
| 2016/0272165 A1 | 9/2016 | Hsiao et al. |
| 2016/0272214 A1 | 9/2016 | Chen |
| 2016/0272242 A1 | 9/2016 | Sham |
| 2016/0272254 A1 | 9/2016 | Wu |
| 2016/0274668 A1 | 9/2016 | Hsiao et al. |
| 2016/0274669 A1 | 9/2016 | Hsiao et al. |
| 2016/0276638 A1 | 9/2016 | Sham |
| 2016/0276721 A1 | 9/2016 | Ho |
| 2016/0276722 A1 | 9/2016 | Ho |
| 2016/0276854 A1 | 9/2016 | Lian |
| 2016/0276855 A1 | 9/2016 | Lian |
| 2016/0276903 A1 | 9/2016 | Lai |
| 2016/0276905 A1 | 9/2016 | Lai |
| 2016/0276963 A1 | 9/2016 | Lai |
| 2017/0080775 A1 | 3/2017 | Cheng |
| 2017/0080776 A1 | 3/2017 | Cheng |
| 2018/0043747 A1 | 2/2018 | Cheng et al. |

FOREIGN PATENT DOCUMENTS

| | | |
|---|---|---|
| CN | 103448685 A | 12/2013 |
| CN | 203372029 U | 1/2014 |
| CN | 103972607 A | 8/2014 |
| CN | 20563241 U | 10/2016 |
| CN | 205651927 U | 10/2016 |
| CN | 205818861 U | 12/2016 |
| DE | 195 42 125 A1 | 5/1996 |
| EP | 1 145 881 A2 | 10/2001 |
| EP | 2 392 486 A2 | 12/2011 |
| EP | 2949520 A1 | 12/2015 |
| JP | 2007253640 A | 10/2007 |
| WO | 2011/076199 A1 | 6/2011 |
| WO | 2014103008 A1 | 7/2014 |

OTHER PUBLICATIONS

U.S. Appl. No. 14/816,064 , "Non-Final Office Action", dated Apr. 29, 2016, 11 pages.

U.S. Appl. No. 14/816,064 , "Notice of Allowance", dated Aug. 31, 2016, 6 pages.

U.S. Appl. No. 14/816,065 , "Non-Final Office Action", dated May 3, 2016, 8 pages.

U.S. Appl. No. 14/816,065 , "Notice of Allowance", dated Aug. 26, 2016, 6 pages.

U.S. Appl. No. 14/821,789 , "Non-Final Office Action", dated Oct. 17, 2016, 29 pages.

U.S. Appl. No. 14/821,789 , "Restriction Requirement", dated Jul. 15, 2016, 6 pages.

U.S. Appl. No. 14/826,217 , "Restriction Requirement", dated Jul. 28, 2016, 6 pages.

U.S. Appl. No. 14/842,803 , "Non-Final Office Action", dated Apr. 29, 2016, 10 pages.

U.S. Appl. No. 14/842,803 , "Notice of Allowance", dated Sep. 12, 2016, 6 pages.

U.S. Appl. No. 14/883,599 , "Non-Final Office Action", dated Apr. 5, 2016, 20 pages.

U.S. Appl. No. 14/883,605 , "Non-Final Office Action", dated Apr. 14, 2016, 13 pages.

U.S. Appl. No. 14/883,605 , "Notice of Allowance", dated Aug. 31, 2016, 7 pages.

U.S. Appl. No. 14/883,621 , "Non-Final Office Action", dated Apr. 25, 2016, 16 pages.

U.S. Appl. No. 14/883,621 , "Notice of Allowance", dated Sep. 14, 2016, 5 pages.

U.S. Appl. No. 14/967,356 , "Final Office Action", dated Aug. 3, 2016, 15 pages.

U.S. Appl. No. 14/967,356 , "Non-Final Office Action", dated Apr. 15, 2016, 14 pages.

U.S. Appl. No. 14/967,357 , "Final Office Action", dated Sep. 29, 2016, 24 pages.

U.S. Appl. No. 14/967,357 , "Non-Final Office Action", dated Jun. 3, 2016, 21 pages.

U.S. Appl. No. 14/967,359 , "Non-Final Office Action", dated Apr. 1, 2016, 20 pages.

U.S. Appl. No. 14/967,360 , "Final Office Action", dated Aug. 3, 2016, 19 pages.

U.S. Appl. No. 14/967,360 , "Non-Final Office Action", dated Apr. 4, 2016, 14 pages.

U.S. Appl. No. 14/967,364 , "Final Office Action", dated Aug. 2, 2016, 14 pages.

U.S. Appl. No. 14/967,364 , "Non-Final Office Action", dated Mar. 7, 2016, 16 pages.

U.S. Appl. No. 14/967,366 , "Final Office Action", dated Aug. 31, 2016, 7 pages.

U.S. Appl. No. 14/967,366 , "Non-Final Office Action", dated Apr. 7, 2016, 13 pages.

(56) References Cited

OTHER PUBLICATIONS

U.S. Appl. No. 14/967,368 , "Non-Final Office Action", dated Apr. 22, 2016, 17 pages.
U.S. Appl. No. 14/967,370 , "Notice of Allowance", dated Aug. 30, 2016, 6 pages.
U.S. Appl. No. 14/967,371 , "Non-Final Office Action", dated May 3, 2016, 8 pages.
U.S. Appl. No. 14/967,371 , "Notice of Allowance", dated Aug. 29, 2016, 6 pages.
U.S. Appl. No. 14/967,372 , "Non-Final Office Action", dated Jul. 15, 2016, 14 pages.
U.S. Appl. No. 14/967,372 , "Restriction Requirement", dated Mar. 21, 2016, 6 pages.
U.S. Appl. No. 14/967,373 , "Final Office Action", dated Sep. 2, 2016, 7 pages.
U.S. Appl. No. 14/967,373 , "Non-Final Office Action", dated Apr. 29, 2016, 10 pages.
U.S. Appl. No. 14/967,374 , "Non-Final Office Action", dated Jul. 13, 2016, 7 pages.
U.S. Appl. No. 14/967,374 , "Restriction Requirement", dated May 5, 2016, 7 pages.
U.S. Appl. No. 14/981,772 , "Non-Final Office Action", dated May 26, 2016, 6 pages
U.S. Appl. No. 14/981,772 , "Notice of Allowance", dated Jul. 28, 2016, 5 pages.
U.S. Appl. No. 15/006,126 , "Non-Final Office Action", dated Jul. 25, 2016, 8 pages.
U.S. Appl. No. 15/008,416 , "Non-Final Office Action", dated Jul. 6, 2016, 8 pages.
U.S. Appl. No. 15/063,435 , "Non-Final Office Action", dated Aug. 8, 2016, 9 pages.
U.S. Appl. No. 15/365,660 , "Notice of Allowance", dated Jun. 30, 2017, 6 pages.
U.S. Appl. No. 15/795,612 , "Notice of Allowance", dated Mar. 6, 2019, 9 pages.
U.S. Appl. No. 62/133,991 , Specification, 41 pages.
U.S. Appl. No. 62/150,848 , Specification, 57 pages.
First Office Action and search report dated Nov. 1, 2017 for CN201610143517.5, 19 pages.
U.S. Appl. No. 14/967,370, "Non Final Office Action", dated Apr. 29, 2016, all pages.
U.S. Appl. No. 14/814,064, "Non Final Office Action", dated Apr. 29, 2016, all pages.
U.S. Appl. No. 15/365,660, "Non Final Office Action", dated Mar. 9, 2017, all pages.
U.S. Appl. No. 15/365,696, "Notice of Allowance", dated Jun. 23, 2017, all pages.
Office Action for EP16159393.4 dated Feb. 1, 2017, all pages.
Office Action for CN201610145859.0 dated Nov. 1, 2017, all pages.
Non Final Office Action dated Aug. 10, 2018 in the corresponding U.S. Appl. No. 15/795,612.

* cited by examiner

ELECTRIC VEHICLE THERMAL MANAGEMENT SYSTEM WITH SERIES AND PARALLEL STRUCTURE

CROSS-REFERENCE TO RELATED APPLICATIONS

The present application is a continuation of U.S. Nonprovisional patent application Ser. No. 15/365,660, filed Nov. 30, 2016, which is a continuation of U.S. Nonprovisional patent application Ser. No. 14/816,064, filed Aug. 3, 2015, which claims priority to U.S. Provisional Patent Application No. 62/150,848, filed Apr. 22, 2015, and U.S. Provisional Patent Application No. 62/133,991, filed Mar. 16, 2015, the disclosures of each of which are hereby incorporated by reference in their entireties for all purposes.

BACKGROUND

Exemplary embodiments of the present disclosure relate to thermal management systems for vehicles, and particularly relate to the field of electric vehicles.

A battery can be used as the power source of an electric vehicle, and the endurance mileage of the electric vehicle is a particularly important aspect of the vehicle. The temperature in a passenger cabin of an existing electric vehicle is generally adjusted by an air conditioning system, in order to maintain the temperature in the passenger cabin within a range that makes people feel comfortable. The battery is also used as the energy source of the air conditioning system, and this generally consumes more battery energy to influence the endurance mileage of the electric vehicle.

SUMMARY

In view of the above problems, aspects of the present disclosure are intended to provide an electric vehicle thermal management system, which may be used for effectively saving the electric power of electric vehicles, and electric vehicles using such thermal management systems.

According to a first aspect of the disclosure, an electric vehicle thermal management system for heating a passenger cabin of an electric vehicle by means of heat absorbed from a battery and/or an electric motor of the electric vehicle is provided. The thermal management system may include one or more of a cooling circuit used for circulating cooling liquid, wherein a battery, an electric motor and a first radiator are fluidly connected in series in the cooling circuit, so that the cooling liquid in the cooling circuit can cool the battery and/or the electric motor to absorb heat. In embodiments, the first radiator may provide a heat source to the passenger cabin by dissipating the heat absorbed by the cooling liquid. In embodiments, the electric motor may be selectively separated from the cooling circuit.

In embodiments, the cooling circuit may include a first part path fluidly connecting the battery and the first radiator, wherein the first part path is provided with a first part path inlet for the inflow of the cooling liquid and a first part path outlet for the outflow of the cooling liquid. In embodiments, the cooling circuit may include a second part path fluidly connecting the electric motor, wherein the second part path is provided with a second part path inlet for the inflow of the cooling liquid and a second part path outlet for the outflow of the cooling liquid. The system may also include a switching device configured to connect the first part path outlet with the second part path inlet and connect the second part path outlet with the first part path inlet at the first state, so as to fluidly connect the battery, the electric motor and the first radiator in series. The switching device may also be configured to connect the first part path outlet with the first part path inlet at the second state, so as to separate the electric motor from said cooling circuit.

In some examples, the switching device may connect the second part path outlet with the second part path inlet at the second state, so that the electric motor is connected to another cooling circuit independent from said cooling circuit.

In some examples, the electric motor may be connected to another cooling circuit, independent from said cooling circuit, after the electric motor is separated from the cooling circuit.

In some examples, the first radiator can be separated from said cooling circuit when the passenger cabin does not need to be heated.

Embodiments may also include a controller configured to control the switching device to switch between the first state and the second state according to the working condition of the battery.

Embodiments may also include a second radiator, wherein the second radiator is arranged to dissipate heat to the outside of the vehicle, and the second radiator is selectively connected in the second part path.

Embodiments may also include a refrigerator for exchanging heat with the first part path. In some embodiments, the refrigerator may be selectively separated from the first part path according to, for example, the temperature of the battery.

According to further aspects of the disclosure, an electric vehicle is provided, including a thermal management system as described herein.

Compared with other methods, embodiments of the disclosure may provide, at least in part, advantages such as effective heat dissipation of the components which generate heat, and meanwhile, the heat generated by the components are effectively transmitted to the passenger cabin, so as to heat the passenger cabin when necessary. Therefore, the electric power of the electric vehicle can be effectively saved to increase the endurance mileage of the electric vehicle.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
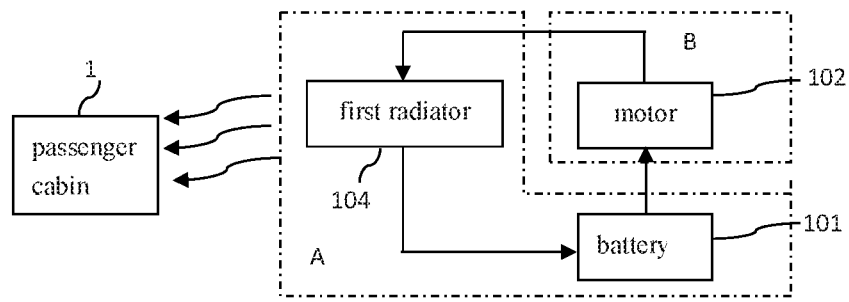
FIG. 1 shows a structural block diagram of a first working mode of an electric vehicle thermal management system according to an embodiment of the disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

Exemplary electric vehicle thermal management systems according to aspects of the present disclosure may be capable of supplying heat to a passenger cabin by means of the heat dissipation of a battery and an electric motor of an electric vehicle. For example, such thermal management systems may be configured connect a cooling liquid flow path of the battery and/or the electric motor to a radiator capable of dissipating heat into the passenger cabin, and the radiator supplies heat to the passenger cabin through the heat absorbed by cooling liquid from the battery and/or the electric motor. The thermal management systems may have a variety of working modes, which are determined by whether the passenger cabin needs heat supply and/or whether the temperature of the battery exceeds a normal working range.

Various working modes of thermal management systems according to the present disclosure will be described below in detail with reference to the accompanying drawings.

FIG. 1 to FIG. 4 show various working modes of an exemplary thermal management system according to aspects of the present disclosure when the passenger cabin needs heat supply.

Reference is now made to FIG. 1. FIG. 1 shows a structural block diagram of the first working mode of an exemplary thermal management system according to aspects of the present disclosure. According to FIG. 1, a first radiator 104 is arranged near a passenger cabin 1, the heat dissipated from the first radiator heats the passenger cabin 1, and the heat source of the first radiator 104 is from the heat dissipated from the battery 101 and the electric motor 102 of the electric vehicle. The electric vehicle thermal management system includes a cooling circuit used for circulating cooling liquid, wherein the battery 101, the electric motor 102 and the first radiator 104 are fluidly connected in series in the cooling circuit, so that the cooling liquid in the cooling circuit can cool the battery 101 and the electric motor 102 and transmit the heat dissipated from the battery 101 and the electric motor 102 to the first radiator 104, so as to supply heat to the passenger cabin 1 through the first radiator 104.

The battery 101 and the electric motor 102 are connected in series in the cooling circuit to effectively transmit the heat of two components which generate heat to the first radiator 104, in order to quickly heat the passenger cabin, so that the heating efficiency is high. This is particularly useful when the environment temperature is low.

Figure 3:
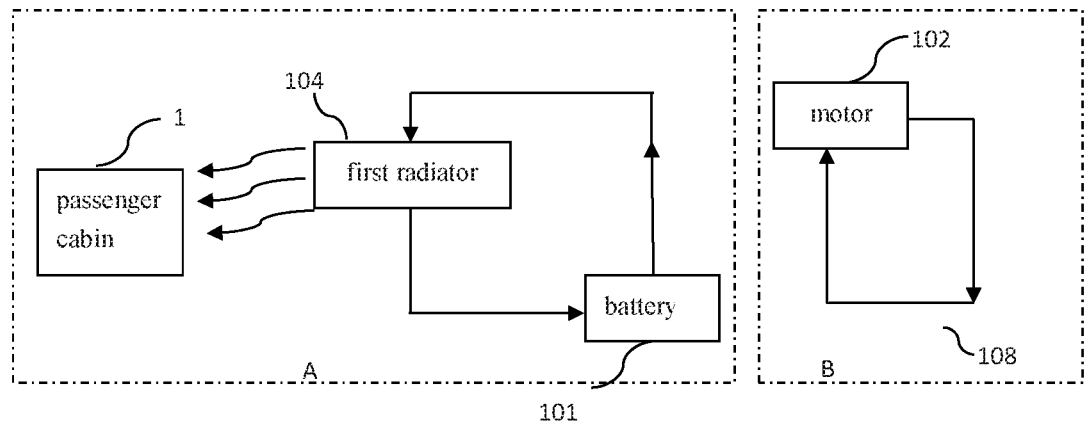
FIG. 3 shows a structural block diagram of a second working mode of the electric vehicle thermal management system according to an embodiment of the disclosure.

FIG. 3 shows a structural block diagram of a second working mode of an exemplary thermal management system according to aspects of the present disclosure. In this embodiment, the electric motor 102 is separated from the cooling circuit where the first radiator as shown in FIG. 1 is connected. At that time, in the cooling circuit where the first radiator is connected, only the first radiator 104 and the battery 101 are connected in series, and the first radiator 104 heats the passenger cabin 1 via the heat dissipated from the battery 101.

This working mode may be selected, for example, according to the temperature of the battery. Since the battery 101 may be very sensitive to temperature, the heat dissipation of the battery 101 may need to be preferentially guaranteed. Normally, the passenger cabin 1 can be simultaneously heated by the heat dissipated from the battery 101 and the electric motor 102, but when the temperature of the battery is relatively high, in order to ensure the effective heat dissipation of the battery 101, separating the electric motor 102 from the cooling circuit can effectively shorten the heat dissipation circuit of the battery 101 and prevent the heat of the electric motor 102 from influencing the heat dissipation of the battery 101, and meanwhile, since the battery 101 continues to provide heat to the first radiator 104, the heat supply of the passenger cabin 1 is still well guaranteed. In this working mode, the heat of the component which generates heat (namely the battery) is effectively transmitted to the passenger cabin 1 without affecting the heat dissipation of the component.

After the electric motor 102 is separated from the cooling circuit where the first radiator is connected, the electric motor 102 may dissipate heat through another cooling circuit 108 independent from the cooling circuit where the first radiator is connected. This guarantees that the heat of the electric motor 102 can be dissipated after it is separated from the cooling circuit, and the heat dissipation of the battery is not influenced by the heat of the electric motor 102.

Figure 6:
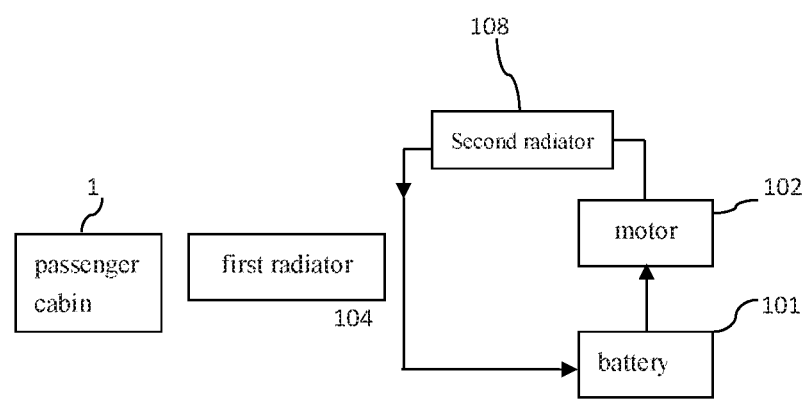
FIG. 6 shows a structural block diagram of a third working mode of the electric vehicle thermal management system according to an embodiment of the disclosure.
Figure 7:
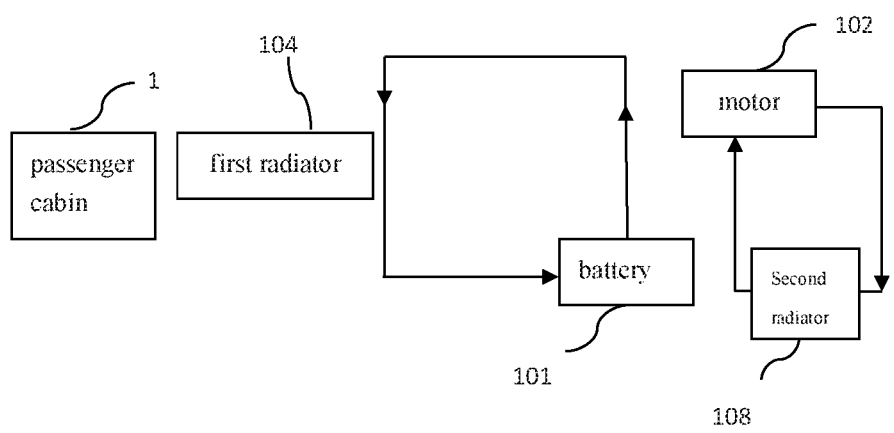
FIG. 7 shows a structural block diagram of a fourth working mode of the electric vehicle thermal management system according to an embodiment of the disclosure.

Reference is made now to FIG. 6 and FIG. 7. FIG. 6 and FIG. 7 respectively show a third working mode and the fourth working mode of an exemplary thermal management system according to aspects of the present disclosure. At the two working modes, since the passenger cabin does not need heat supply due to a higher environment temperature, the first radiator 104 is separated from the cooling circuit. In the third working mode as shown in FIG. 6, the first radiator 104 is separated from the cooling circuit, and the battery 101 and the electric motor 102 are connected in series in the cooling circuit. In the fourth working mode as shown in FIG. 7, the first radiator 104 is separated from the cooling circuit, and the battery 101 and the electric motor 102 are respectively connected in two independent cooling circuits. When the temperature of the battery 101 is normal, the thermal management system may operate at the third working mode, and when the temperature of the battery 101 is too high, the thermal management system may be switched to the fourth working mode.

Some components that may be used in exemplary cooling circuits of the thermal management system are described below in order to illustrate how the above-mentioned various working modes may be switched.

Figure 2:
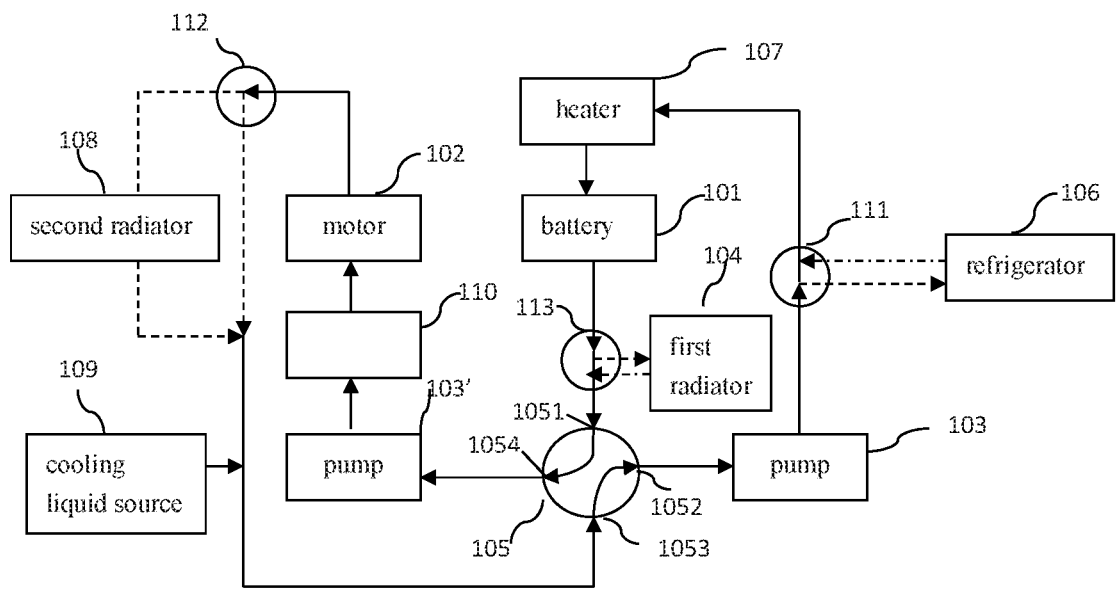
FIG. 2 is a more detailed schematic view of the first working mode in FIG. 1.

Looking at FIG. 1 and FIG. 2 first, FIG. 2 shows a more detailed schematic view of the first working mode in FIG. 1. As shown in FIG. 1, the cooling circuit includes a first part path (A), and the first part path (A) fluidly connects the battery 101 and the first radiator 104. As shown in FIG. 2, the first part path (A) is provided with a first part path inlet 1052 for the inflow of the cooling liquid and a first part path outlet 1051 for the outflow of the cooling liquid. The cooling circuit further includes a second part path (B), wherein the second part path (B) fluidly connects the electric motor 102, and the second part path (B) is provided with a second part path inlet 1054 for the inflow of the cooling liquid and a second part path outlet 1053 for the outflow of the cooling liquid. The first part path (A) and the second part path (B) are connected and separated by a switching device 105.

Figure 4:
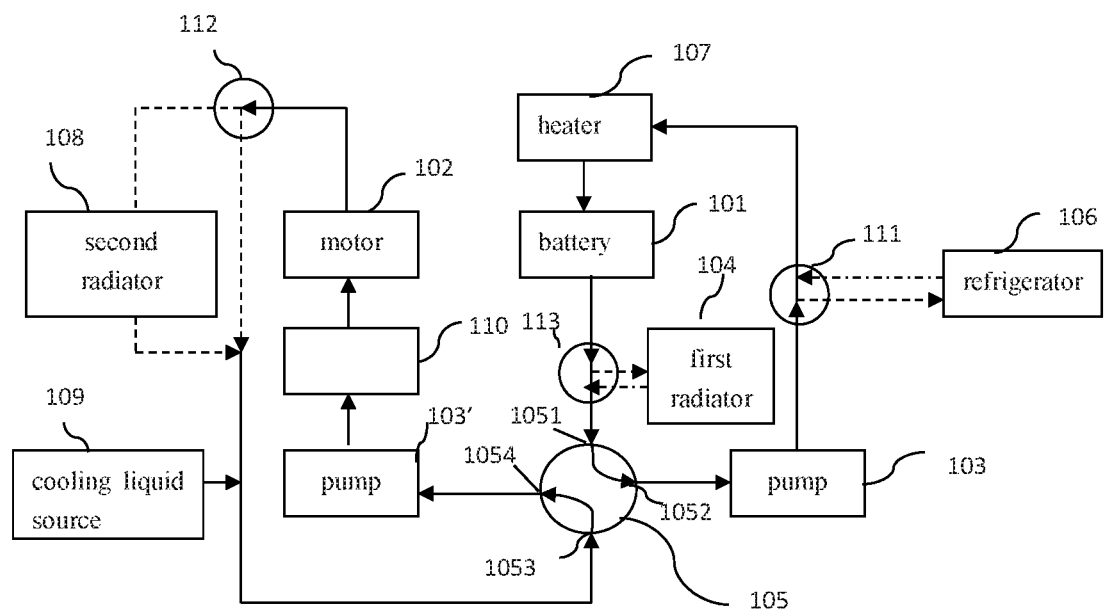
FIG. 4 is a more detailed schematic view of the second working mode in FIG. 3.

Specifically, the switching device 105 has two states, FIG. 2 shows the first state of the switching device 105, and FIG. 4 shows the second state of the switching device. At the first state as shown in FIG. 2, the switching device 105 connects the first part path outlet 1051 with the second part path inlet 1054 and connects the second part path outlet 1053 with the first part path inlet 1052, so as to connect the first part path (A) with the second part path (B), namely, the battery 101, the electric motor 102 and the first radiator 104 are connected in series in the cooling circuit. At the second state as shown in FIG. 4, the switching device 105 connects the first part path outlet 1051 with the first part path inlet 1052 so as to separate the first part path (A) from the second part path (B), namely, the electric motor 102 is separated from the cooling circuit of the battery. At the second state, the switching device 105 further connects the second part path outlet with the second part path inlet so as to form another cooling circuit for independently cooling the electric motor 102. Thus, the thermal management system may be switched to the second working mode as shown in FIG. 3.

The switching device 105 can be selected, for example, from a four-way valve or the combination of multiple three-way valves.

As shown in FIG. 2 and FIG. 4, pumps 103, 103' are respectively connected in the first part path (A) and the second part path (B) for conveying the cooling liquid to the components to be cooled in the paths and determining the flow rate of the cooling liquid in the paths. A cooling liquid source 109 may be connected with the cooling circuit and used for supplementing the cooling liquid for the cooling circuit when the cooling liquid in the cooling circuit is lost.

The first radiator 104 is connected with the cooling circuit through a switch 113. At the two working modes as shown in FIG. 1 and FIG. 3, the switch 113 is turned on to connect the first radiator 104 into the cooling circuit, so as to supply heat to the passenger cabin. When the passenger cabin does not need heat supply, the switch 113 may be turned off, so as to separate the first radiator 104 from the cooling circuit. At that time, the thermal management system can be in the working modes as shown in FIG. 6 and FIG. 7.

As shown in FIG. 2 and FIG. 4, a second radiator 108 may also be provided in the thermal management system. The second radiator 108 is arranged to selectively connected in the cooling circuit to dissipate the heat absorbed from the cooling circuit to the outside of the vehicle. When the second radiator 108 is connected in the cooling circuit, the thermal management system can be in the working modes as shown in FIG. 6 and FIG. 7.

Reference is made to FIG. 2 and FIG. 4 again, in which the second radiator 108 is connected to the second part path (B) through a switch 112. When the switch is turned on, the second radiator 108 may be connected with the second part path (B), and then, the thermal management system can be in the working modes as shown in FIG. 6 and FIG. 7. When the switch is turned off, the second radiator 108 may be disconnected with the second part path (B), and then, the thermal management system can be in the working modes as shown in FIG. 1 and FIG. 3.

For the working mode as shown in FIG. 6, the battery 101, the electric motor 102 and the second radiator 108 are connected in series, and the heat of the battery 101 and the electric motor 102 are dissipated to the outside of the vehicle by the second radiator 108; for the working mode as shown in FIG. 7, the electric motor 102 and the second radiator 108 are connected in series in the second part path, while the heat of the battery 101 is not dissipated to the outside of the vehicle by the second radiator 108, and only the heat of the electric motor 102 is dissipated to the outside of the vehicle by the second radiator 108.

Reference is still made to FIG. 2 and FIG. 4, which show an example of a refrigerator 106 that may also be provided in the thermal management system, e.g. for being selectively connected in the cooling circuit according to the temperature of the battery. The refrigerator 106 can cool the cooling liquid in the cooling circuit to enable the cooling liquid to better cool the components which have high temperature. Since the battery 101 has a higher requirement on the working temperature compared with other components, for example, the electric motor 102, the refrigerator 106 is preferably arranged to be selectively connected with the first part path (A), in order to quickly cool the battery 101 when the temperature of the battery 101 is too high. For example, the refrigerator 106 may be connected to the first part path (A) through a switch 111, and when the temperature of the battery 101 is too high and the cooling liquid needs to be cooled, the switch 111 may be turned on to connect the refrigerator 106 in the first part path (A); when the cooling liquid does not need to be cooled, the switch 111 may be turned off to separate the refrigerator 106 from the first part path (A). In other embodiments, the refrigerator 106 can be connected to other positions of the cooling circuit.

The switch 113, the switch 111 and the switch 112 can use, for example, three-way valves. The switch 113 and the switch 111 may be constituted, for example, from two three-way valves.

A heater 107 may also be provided in the thermal management system, and the heater 107 may be connected in the first part path (A) to selectively heat the cooling liquid flowing to the battery. Specifically, the heater 107 is arranged upstream of the battery 101, namely, the cooling liquid firstly flows through the heater 107 and then flows through the battery 101, and a control device 201 controls the heater 107 to start or stop, in order to select to heat the cooling liquid or not. Due to this arrangement, the battery 101 can be quickly heated when the temperature of the battery 101 is low.

Besides the electric motor 102, other components 110 which can generate heat in the electric vehicle, for example, a charger and the like, can also be connected in the second part path (B) so that the other components 110 which can generate heat can be cooled by the second part path. When the switching device 105 is at the first state, the heat of the other components 110 which can generate heat is also transmitted to the first radiator 104 to provide heat to the passenger cabin 1.

Figure 5:
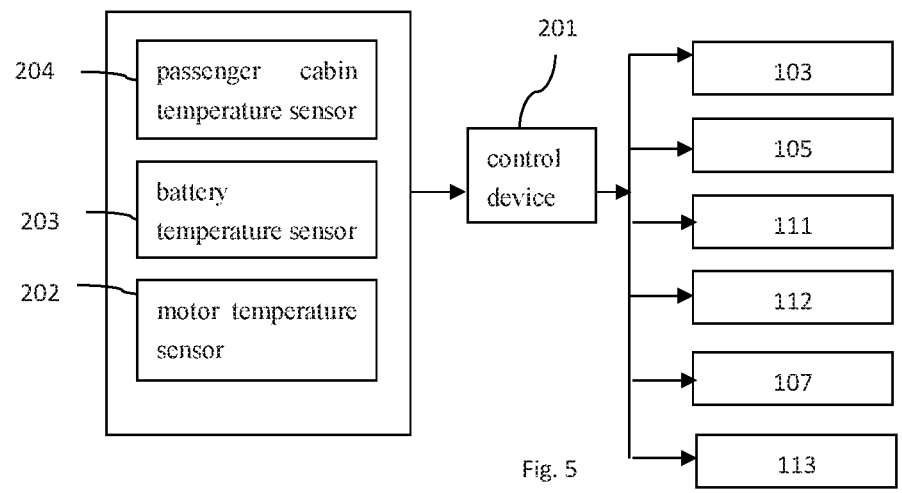
FIG. 5 shows a control block diagram of the electric vehicle thermal management system according to an embodiment of the disclosure.

The control flow of an exemplary electric vehicle thermal management system according to aspects of the present disclosure will be illustrated below with reference to the control block diagram of the electric vehicle thermal management system as shown in FIG. 5. As shown in FIG. 5, a passenger cabin temperature sensor 204, a battery temperature sensor 203, a motor temperature sensor 202 and the control device 201 may be provided in the electric vehicle thermal management system. The passenger cabin temperature sensor 204, the battery temperature sensor 203 and the motor temperature sensor 202 respectively detect the temperatures of the passenger cabin, the battery and the motor and transmit the detected temperatures to the control device 201. The control device 201 controls the actions of the pump 103, the switching device 105, the switch 111, the switch 112, the switch 113 and the heater 107 according to comprehensive judgments of temperatures of the devices and an external passenger instruction, so as to switch the thermal management system among the various working modes.

When the vehicle is at a normal running state, the control device 201 firstly determines to connect the first radiator 104 in the cooling circuit or connect the second radiator 108 in the cooling circuit according to an instruction sent by the passenger indicating whether the passenger cabin need heat supply.

Normally, if an instruction from the passenger indicating whether the passenger cabin need heat supply has not been received, the second radiator 108 is connected in the cooling circuit to dissipate the heat absorbed by the cooling circuit to the outside of the vehicle, while the first radiator 104 is separated from the cooling circuit.

When the passenger sends an instruction indicating to supply heat to the passenger cabin, the control device 201 controls the switch 112 of the second radiator 108 to turn off to separate the second radiator 108 from the cooling circuit, and controls the switch 113 of the first radiator 104 to turn on to connect the first radiator 104 in the cooling circuit. Then, the control device 201 judges whether the battery 101 and the electric motor 102 are within normal working temperature ranges according to the temperatures detected by the battery temperature sensor 203 and the motor temperature sensor 202. If it is judged that both the battery 101 and the electric motor 102 are within the normal working temperature ranges, the control device 201 controls the switching device 105 to be at the first state, and then, the battery 101, the electric motor 102 and the first radiator 104 are fluidly connected in series, and the battery 101 and the electric motor 102 heat the passenger cabin 1 at the same time. When the temperature of the battery 101 exceeds the normal working temperature range, the control device 201 controls the switching device 105 to be at the second state and controls the switch 112 of the second radiator 108 to turn on, and then the battery 101 and the electric motor 102 are respectively connected in different cooling circuits, the first radiator 104 supplies heat to the passenger cabin by means of the temperature of the battery, and the heat of the motor 102 can be dissipated by the second radiator to the outside of the vehicle. At that time, the control device 201 can also control the switch 111 of the refrigerator 106 to turn on to connect the refrigerator 106 with the cooling circuit, in order to cool the cooling liquid flowing through the battery via the refrigerator 106 to further accelerate the cooling of the battery. Moreover, no matter whether the switching device 105 is at the first state or the second state, the control device 201 can judge whether there is a need to control the pumps 103, 103' to accelerate according to the temperatures of the battery 101 and the electric motor 102, in order to accelerate the flow rate of the cooling liquid in the cooling circuit to speed up the cooling rate.

When the vehicle is just started, according to the temperature of the battery 101, the control device 201 further needs to judge whether there is a need to heat the battery, in order to quickly heat up the battery to a degree that is enough for the battery to operate normally. If it is judged that the battery needs to be heated, the control device 201 controls the heater 107 to start, the heat of the heater 107 will help to heat the battery 101, at that time, the switching device 105 is controlled and switched to the second state, namely the battery 101 and the electric motor 102 are respectively connected in different cooling circuits, in order to prevent the heat of the heater 107 from influencing the temperature of the electric motor 102.

In addition, when the temperature of the passenger cabin is low or when the passenger instructs to heat the passenger cabin, the control device 201 can control the heater 107 to start, and the heat provided by the heater 107 will also supply heat to the passenger cabin 1.

According to the instruction sent by the passenger indicating not to supply heat to the passenger cabin, the control device 201 can also control the switch 113 of the first radiator 104 to turn off to separate the first radiator 104 from the cooling circuit and control the switch 112 of the second radiator 108 to turn on to connect the second radiator 108 in the cooling circuit.

By adopting the above-mentioned heat exchange system, various embodiments of the present disclosure may supply heat to the passenger cabin by using the heat absorbed by the cooling liquid from the battery and/or the electric motor, so that the electric power of the electric vehicle can be effectively utilized to increase the endurance mileage of the electric vehicle.

The present disclosure further provides an electric vehicle using the above-mentioned vehicle thermal management system, the other parts of the electric vehicle can adopt the structure of existing electric vehicles, with a vehicle thermal management system as described herein, and will not be repeated redundantly.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. An electric vehicle thermal management system for heating a passenger cabin of an electric vehicle by means of heat absorbed from at least one of a battery and an electric motor of the electric vehicle, the electric vehicle thermal management system comprising:
   a radiator;
   a switching device; and
   a cooling circuit for circulating cooling liquid; and, wherein
      the battery, the electric motor and a first radiator are fluidly connected in series in the cooling circuit;
   the cooling circuit comprises:
      a first part path fluidly connecting the battery and the radiator, wherein the first part path is provided with a first part path inlet for the inflow of the cooling liquid and a first part path outlet for the outflow of the cooling liquid; and
      a second part path fluidly connecting the electric motor, wherein the second part path is provided with a second part path inlet for the inflow of the cooling liquid and a second part path outlet for the outflow of the cooling liquid; and
   the switching device is configured to selectively connect at least one of the battery and electric motor to the radiator, the selective connecting by the switching device comprises:
      connecting the first part path outlet with the second part path inlet and connecting the second part path with the first part path inlet to fluidly connect the battery, the electric motor and the radiator in series.

2. The system of claim 1, wherein the switch device is configured such that:
   after the electric motor is separated from the cooling circuit by the switch device, the electric motor is connected to another cooling circuit independent from the cooling circuit.

3. The system of claim 1, wherein:
   in response to an indication that the passenger cabin does not need to be heated, the switching device is further configured to disconnect the radiator from the cooling circuit.

4. The system of claim 3, wherein:
   in response to an indication that the radiator is separated from the cooling circuit, the motor and the battery are at least one of connected in the cooling circuit or respectively connected in different cooling circuits.

5. The system of claim 1, wherein the switching device is further configured to connect the second part path outlet with the second part path inlet so that the electric motor is connected to another cooling circuit independent from the cooling circuit.

6. The system of claim 1, wherein the switching device connects the second part path outlet with the second part path inlet at a second state, so that the electric motor is connected to another cooling circuit independent from said cooling circuit.

7. The system of claim 1, further comprising:
   a controller configured to control the switching device according to the working condition of the battery.

8. The system of claim 1, further comprising:
   a cooling liquid source connecting with the cooling circuit for providing cooling liquid to the cooling circuit.

9. The system of claim 1, further comprising:
   a refrigerator for exchanging heat with the first part path; and, wherein
   the refrigerator is selectively separated from the first part path according to the temperature of the battery.

10. The system of claim 1, further comprising:
    a heater, wherein the heater is connected in the first part path;
    the control device controls the heater to start or stop.

11. The system of claim 1, further comprising:
    a controller, wherein the controller is configured to control the switching device to switch between a first state and a second state of the cooling circuit according to the working condition of the battery.

12. The system of claim 1, further comprising:
    a refrigerator for exchanging heat with the first part path, wherein
    the refrigerator is configured to be selectively separated from the first part path according to the temperature of the battery.

13. The system of claim 1, further comprising:
    a heater, wherein the heater is connected in the first part path; and, wherein
    the control device is further configured to control activation and deactivation of the heater.

14. The system of claim 1, wherein the switching device is further configured to connect the second part path outlet with the second part path inlet so that the electric motor is connected to another cooling circuit independent from the cooling circuit.

* * * * *